Aug. 25, 1964 R. BELLMANN 3,145,575
MAIN DRIVES FOR THE TRANSLATORILY DISPLACEABLE
WORK SPINDLE OF MACHINE-TOOLS
Filed July 19, 1961 3 Sheets-Sheet 1
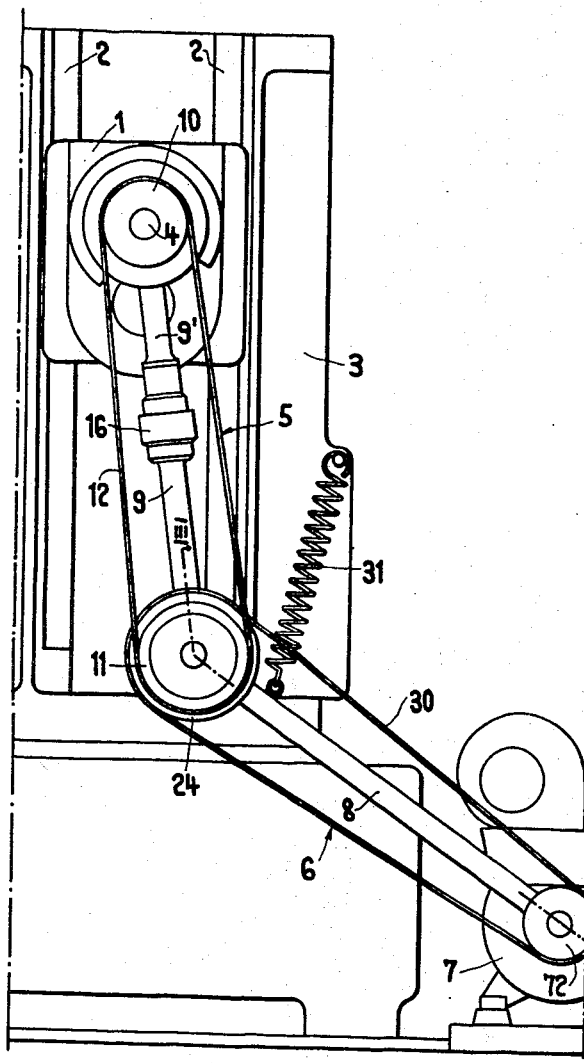
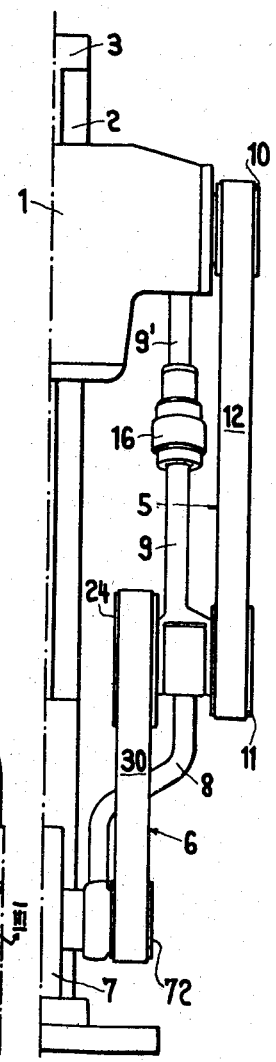
INVENTOR
Reinhold Bellmann

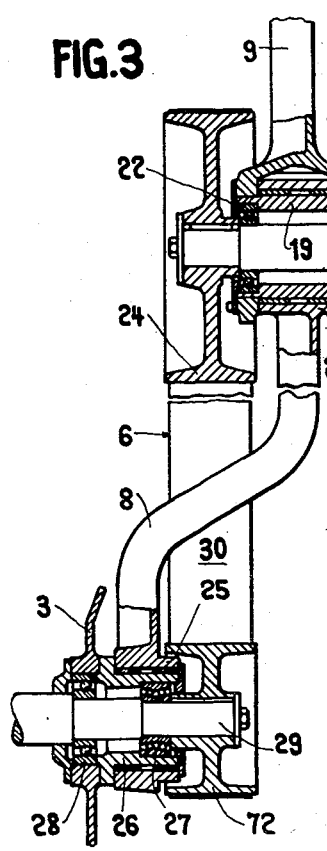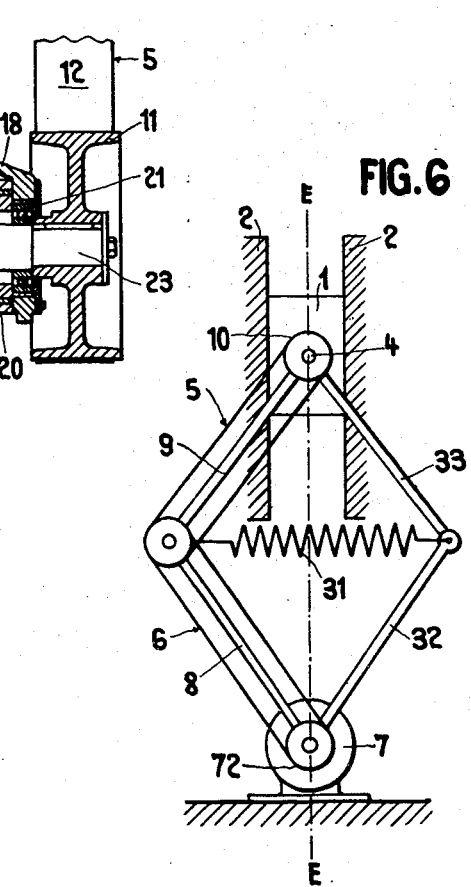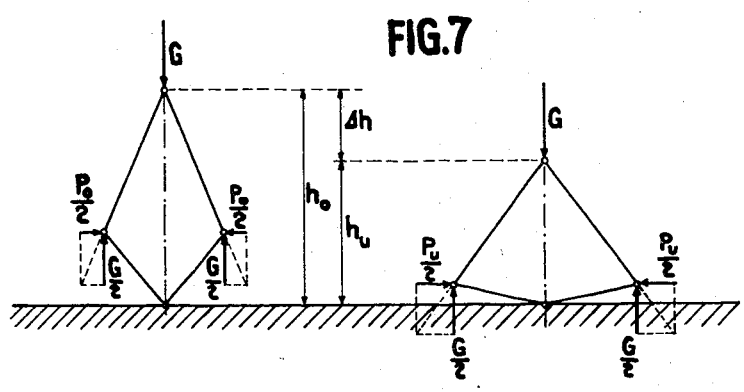

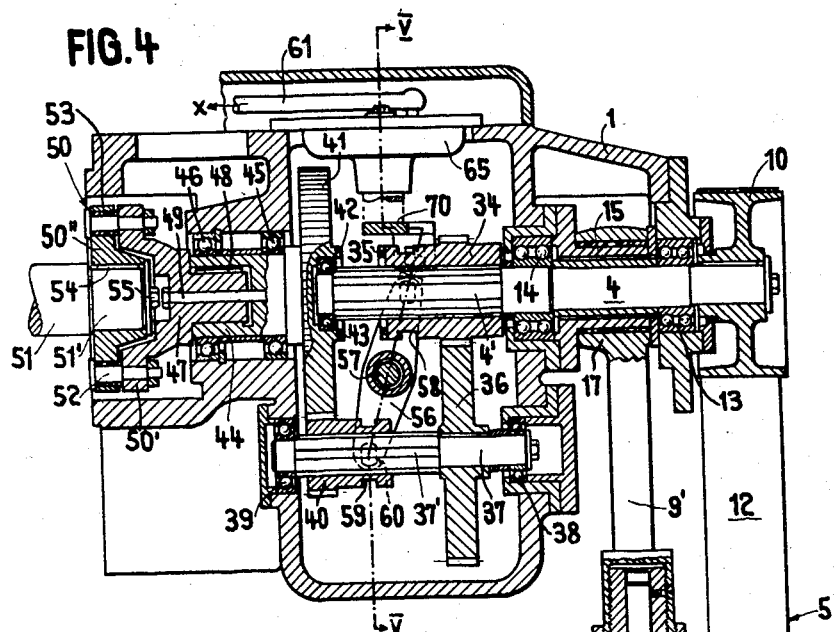
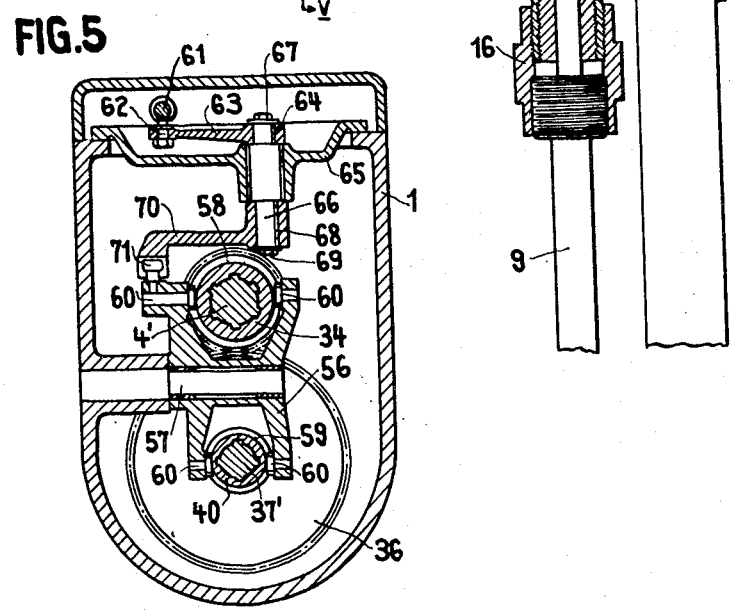

United States Patent Office 3,145,575
Patented Aug. 25, 1964

3,145,575
MAIN DRIVES FOR THE TRANSLATORILY DISPLACEABLE WORK SPINDLE OF MACHINE-TOOLS
Reinhold Bellmann, Le Locle, Switzerland, assignor to Dixi S.A., Le Locle, Switzerland
Filed July 19, 1961, Ser. No. 125,274
Claims priority, application Switzerland Sept. 5, 1960
11 Claims. (Cl. 74—228)

This invention relates to a drive arrangement for the work spindle of a machine tool, such as a horizontal milling and boring machine in which the work spindle is arranged for translator movement in a direction radial with respect to its axis of rotation. The work spindle is mounted on a spindle head, and may be rotated at two speeds, being connected to a driving element through reduction gearing in the spindle head or directly.

Modern machine tools must meet steadily increasing requirements as to precision performance. This is especially true of horizontal milling and boring machines. Because of the relatively wide required speed range of the work spindle, for example, from 50 to 1500 r.p.m., multiple stage transmissions including many gear wheels are employed in known drive arrangements for such machine and impair the precision of the apparatus.

Especially at high speeds, gear wheels are sources of torsional vibrations due to tooth clearance originating from unavoidable manufacturing tolerances or even intentionally provided to permit thermal expansion. Such torsional vibrations not only impair the precision of machine tool performance but also cause tool marks on the machined workpiece surfaces. Such tool marks are caused by the "chattering" gear wheels.

For the above-mentioned reasons, it has been tried to reduce the number of gear wheels to a minimum and to use infinitely variable drives. Hydraulic drives of this kind have a relatively small speed range and are bulky. They are therefore relatively rarely used in machine tools. An electric drive equipped with Ward-Leonard controls is infinitely variable over a sufficiently wide speed range, and is often used in machine tools. However, the well-known advantages of such a drive arrangement, such as simple control, reversibility, and electric braking are offset by high first cost and low efficiency.

Even if a machine tool having a work spindle arranged for translator movement such as a horizontal milling and boring machine is equipped with Ward Leonard controls, it is not practical to mount the main driving motor directly on the spindle box. In some heavy machine tools, the weight of the motor would interfere with raising and lowering of the spindle box. The heat generated by the motor, moreover, may cause deformation of adjacent components of the machine tool, and thereby impair the precision performance of the machine tool. For this reason, it is customary to arrange heat sources such as motors as far as possible from critically important components such as the spindle box, the frame and the like. Therefore, the rotation of the drive motor is usually transmitted to the work spindle by means of bevel gearing and a splined shaft. The bevel gear wheels, however, are a source of undesired or even dangerous torsional vibrations.

In addition to the above-mentioned torsional vibrations, flexural vibrations of the work spindle may reduce the precision of machine tool performance. Flexural vibrations occur when the working spindle is deflected by the drive even to a very small extent. It has been tried to avoid such flexural vibrations by more rigid construction and by special bearing arrangements for the work spindle. The improvements obtained, however, were not within a reasonable relationship to the expenditure involved.

It is the principal object of this invention to provide a main drive for the work spindle of a machine tool such as a horizontal milling and boring machine in which the input shaft of the spindle head is connected with the work spindle by reduction gearing at low speed and is directly engaged with the work spindle at high speed, yet to avoid flexural and torsional vibrations of the work spindle or at least to reduce them to such an extent as to make them harmless.

It is a further object of the invention to substantially prevent heat transfer to the work spindle as far as possible.

Additional objects and advantages of the invention will become apparent from the following description of preferred embodiments illustrated in the accompanying drawings in which:

FIG. 1 shows a portion of a horizontal milling and boring machine with its main motor drive in side elevation;

FIG. 2 is a partial front elevational view of the apparatus of FIG. 1;

FIG. 3 is a sectional view taken along the line III—III of FIG. 1, on a larger scale;

FIG. 4 is a front elevational sectional view of the spindle head shown in FIG. 2;

FIG. 5 is a sectional view taken on the line V—V in FIG. 3;

FIG. 6 illustrates a modification of the motor drive shown in FIG. 1;

FIG. 7 is a diagram of the forces resulting from the weight of the spindle head in a drive according to FIG. 6.

In the horizontal milling and boring machine illustrated in FIGS. 1 to 5, a spindle head 1 encloses a speed reducing gear transmission. A work spindle, not seen in FIGS. 1 and 2 to which this description initially refers, is mounted on the spindle head for rotation about its axis, and is radially displaceable by movement of the spindle head on guide ways 2 of the machine frame 3. The input shaft 4 of the gear transmission is driven by two belt drive arrangements 5 and 6 which are interposed in series between a main drive motor 7 and the input shaft 4 of the gear transmission as will be described hereinafter.

The spindle head 1 which encloses the gear transmission and carries the work spindle can be raised and lowered without affecting the driving connection with the motor 7. Because of the absence of interposed gear wheels, torsional vibrations are prevented from reaching the spindle head 1 even if the drive motor 7 acts as a vibration exciter. The vibrations are not transmitted to the spindle head and to its gear transmission, but are absorbed by the resilient belt drive arrangements 5 and 6.

The belt drive arrangements 5 and 6 are equipped with flat belts, but these may be replaced by multiple V-belts if so desired. The upper belt drive arrangement 5 comprises two pulleys 10 and 11 connected with each other by a belt 12. The pulley 10 is keyed to the free end of the input shaft 4 of the spindle head gear transmission (FIG. 4). The shaft 4 is journaled in the casing of the spindle head 1 by means of two ball bearings 13 and 14. A sleeve 15 rigidly fixed to the spindle head 1 and coaxially surrounding the shaft 4 constitutes a pivot for a linkage associated with the upper belt drive 5. The linkage includes two bar-shaped components 9 and 9' connected end to end by means of a sleeve 16 having respective internal left-hand and right-hand threads engaging the ends of the bars 9, 9' (FIG. 4). The belt 12 may be tensioned by turning the sleeve 16. If so desired, the effective length of the linkage bar 8 associated with the lower belt drive 6 may be made variable in an analogous manner.

For the same purpose, the linkages 9, 9' or 8 may each consist of two at least partially hollow component parts telescopically engaging each other, and resilient means provided between the telescoping component parts to urge them away from each other so that the associated belt is under practically constant tension.

The free end 17 of the linkage component 9' (FIG. 4) is rotatably mounted on the sleeve 15, while the fork-shaped free end 18 of the linkage component 9 (FIG. 3) receives a hollow pin 19 on which the upper end 20 of the linkage rod 8 associated with the lower belt drive 6 is hingedly mounted. In the hollow pin 19, ball bearings 21 and 22 are provided for supporting a shaft 23. Two pulleys 11 and 24 are keyed to respective ends of this shaft. The lower end 25 of the linkage bar 8 associated with the belt drive 6 embraces a hollow pin 26 fixedly connected with the casing 3' of the drive motor 7. The hollow pin 26 is coaxial with the output shaft 29 of the motor 7, this shaft being supported on ball bearings 27 and 28. A pulley 72 is keyed to the free end of the motor shaft 29 and is connected with the pulley 24 by means of a belt 30. By selecting pulleys 72, 24 and 11, 10 of different diameters two speed changing steps are available in this part of the drive mechanism, the speed ratios being relatively quickly adjustable by interchanging the pulleys.

The weight of the spindle head 1 may be balanced in a known manner by means of counterweights hung from chains trained over rolls. In the embodiment of the invention illustrated in FIG. 1, the weight of the spindle head is balanced by a spring 31 one end of which is anchored on the machine frame 3 and the other end of which is attached to the bar 8 of the belt drive 6. The spring urges the bars 8, 9 and 9' toward a longitudinally aligned position.

FIGS. 4 and 5 respectively illustrate the spindle head 1 in front-elevational and side-elevational section. The inner end portion 4' of the shaft 4 is splined to an axially slidable pinion 34. The pinion 34 is provided on a radial end face with clutch dogs 35.

In the position shown in FIG. 4, the sliding pinion 34 meshes with a spur wheel 36 keyed to a counter shaft 37 parallel to the input shaft 4 and supported on the casing of the spindle head 1 by means of ball bearings 38 and 39. The countershaft 37 has a splined portion 37' on which a pinion 40 is axially slidable. In the position shown in FIG. 4, the sliding pinion 40 engages a spur gear 41 coaxially rotatable on the input shaft 4. The spur gear 41 has clutch dogs 42 on its radial face opposite the sliding pinion 34. A central recess in the spur gear 41 receives a ball bearing 43 which serves as a support and a centering means for the inner end of the input shaft 4.

A tubular hub 44 is fixedly attached to the other radial face of the spur gear 41, and is mounted on the casing of the spindle head 1 by means of ball bearings 45 and 46. The hub 44 constitutes the output shaft of the gear transmission. It is connected to the coaxial work spindle 51 by a torsionally resilient coupling 50 including two elements 50' and 50''. The generally bell-shaped coupling element 50' has a central cylindrical portion 47 which engages the axial bore of the hub 44. The coupling element 50' is coupled to the hub 44 for joint rotation by means of a key 48 in the bore of the hub and is axially secured to the hub by a bolt 49. The other coupling element 50'' has a central bore receiving the end 51' of the work spindle 51. The coupling element 50'' and the spindle end 51' are connected for joint rotation by a key 54 and are axially secured to each other by a set screw 55. The two coupling elements 50' and 50'' are spacedly connected by coupling pins 52 which are resiliently mounted in the coupling element 50'' by means of coaxial rubber bushings 53.

The resilient coupling 50 protects the work spindle 51 against torque fluctuations such as periodical or aperiodical shocks generated in the drive arrangement. The coupling 50 which is resilient in the direction of rotation may be replaced or supplemented by a centrifugal pendulum or any other dynamic counterweight may be provided at any suitable place. Such a pendulum may, for instance, be constructed as a bifilar pendulum with a parallel crank gear in which all the points of the pendulum mass, therefore also the center of gravity, describe congruent trajectories in the shape of circular arcs with small radii. However, also vibration-eliminating means may be used which in their behaviour differ from the ideal simple or mathematical pendulum, such as larger roller bodies acting as material pendulums. In pendulums of this kind, the pendulum weights may be arranged as outer rolls (rings) around stationary pins or as inner rolls (solid rolls) in cylindrical bores of shaft flanges.

Simultaneous positive displacement of the pinions 34, 40 in an axial direction is actuated by a lever 56 having forked arms. The lever 56 is pivotally mounted on a horizontal pin 57 fixed on the casing of the spindle head 1. Two pairs of pins 60 are respectively fastened to the forked arms of the lever 56 and engage annular grooves 58, 59 of the pinions 34 and 40. The lever 56 is pivoted by means of a speed shifting rod 61 linked to one arm 63 of a belt crank lever by means of a ball headed pin 62. The arm 63 is secured by a key 64 against rotation relative to the upper end of a shaft 66 journalled in a vertical bore of a fixed partition wall 65 and is axially secured by a bolt 67. In a similar manner, the second arm 70 of the bell crank lever is attached to the lower end of the shaft 66 by a key 68 and by a bolt 69. The free slotted end of the arm 70 engaged a knob 71 projecting from the upper arm of the lever 56.

In the position of the gear transmission shown in FIG. 4, torque is transmitted from the pulley 10 through the input shaft 4, the pinion 34, the spur wheel 36, the countershaft 37, the pinion 40, the spur wheel 41, the hub 44, and the torsionally resilient coupling 50 to the work spindle 51 whose speed is considerably lower than that of the input shaft 4. If the speed shifting rod 61 is moved in the direction of the arrow $x$, the lever 56 is swung counterclockwise as viewed in FIG. 4, whereby the pinion 34 is shifted towards the left, and the pinion 40 is shifted towards the right.

When the lever 56 is in a vertical position, the pinion 34 does not engage the spur wheel 36, nor is the pinion 40 meshed with the spur wheel 41. The input shaft 4 idles with the pinion 34 and the work spindle 51 is disconnected from the drive motor 7. When the lever 56 is further pivoted in a counterclockwise direction, the pinion 34 is displaced towards the left until its clutch dogs 35 engage the clutch dogs 42 of the spur wheel 41. The pinion 40 is further displaced towards the right and thus remains disengaged from the spur wheel 41. In this position of the transmission, torque is transmitted from the pulley 10 through the shaft 4, the dog clutch 35, 42, the hub 44 and the elastic coupling 50 directly to the work spindle 51.

In the absence of any toothed wheel meshing with another toothed wheel, torsional vibrations cannot be generated within the spindle head mechanism. Moreover, since the counter-shaft 37 with the spur gear 36 and the pinion 40 is at rest, stirring of the oil-bath in the spindle head is decreased to a minimum so that heating of the oil and of the spindle head casing is very considerably reduced. The relatively small amount of heat reaching the coupling element 50' cannot be transferred to the work spindle 51, because of the air gap between the coupling elements 50' and 50'', and because of the heat-insulating effect of the bushings 53.

In the modified belt drive arrangement shown in FIG. 6, one end portion of a bar 33 is pivotally movable about the axis of the shaft 4, and one end portion of a bar 32 is similarly movable with respect to the axis of the pulley 72. The other end portions of the bars 32, 33 are hingedly connected. The bars 32, 33 are approximately symmetrical to the linkage bars 8, 9 relative to a plane E—E including the axes of the pulleys 10 and 72. The tension spring 31' which balances the spindle head 1 connects the pivots which respectively join the linkage bars 8, 9 and the bars 32, 33.

The length of the bars 8, 9, 32, 33 are selected to suit the maximum vertical adjustment $\Delta h$ of the spindle head (FIG. 7). From the highest spindle head position $h_o$ to the lowermost spindle head position $h_u$ the resilient force of the draw spring 31' should be at least approximately proportional to the respective horizontal force components $P_o$ or $P_u$ exerted on the pivots between the linkage bars 8, 9 and the bars 32, 33 by the weight G of the spindle head.

Various modifications of the drive arrangement disclosed are contemplated and may be obviously resorted to by those skilled in the art without departing from the spirit and scope of the invention as hereinafter defined by the appended claims, as only preferred embodiments thereof have been disclosed.

I claim:
1. In a machine tool, in combination:
   (a) frame means;
   (b) spindle head means;
   (c) work spindle means mounted on said head means for rotation about an axis;
   (d) guide means connecting said spindle head means to said frame means for translatory movement in a radial direction relative to said axis;
   (e) a drive motor in fixed spatial relationship to said frame means; and
   (f) motion transmitting means operatively connecting said motor to said work spindle means for actuating said rotation of the latter, said motion transmitting means including
      (1) vibration absorbing means interposed between said motor and said work spindle means for absorbing torsional vibrations generated by said motor, and
      (2) multiple speed transmission means including
         ($2_1$) an input member operatively connected to said motor,
         ($2_2$) an output member operatively connected to said spindle head means,
         ($2_3$) a train of meshing gears, and
         ($2_4$) control means alternatively operative for interposing said gear train between said input and output members, and for directly connecting said input and output members.

2. In a machine tool as set forth in claim 1, said vibration absorbing means being interposed between said transmission means and said drive motor.

3. In a machine tool as set forth in claim 1, heat insulating means interposed between said output member and said work spindle means.

4. In a machine tool as set forth in claim 1, said vibration absorbing means including a first and a second linkage member, each linkage member having two spaced portions, one of said portions being connected to the corresponding portion of the other linkage member for pivotal movement about a second axis, the other portion of said first linkage member being arranged for pivotal movement about a third axis fixedly spatially related to said spindle head means, and the other portion of said second linkage member being arranged for pivotal movement about a fourth axis fixedly spatially related to said motor, and two belt drive arrangements, each including two pulley means and belt means trained over said pulley means, the two pulley means of one of said belt drive arrangements being respectively rotatable about said second and third axes, and the two pulley means of the other belt drive arrangement being rotatable about said second and fourth axes, the pulley means rotatable about said second axis being connected to each other for joint rotation, and the pulley means rotatable about said third and fourth axes being respectively operatively connected to said input member and to said motor.

5. In a machine tool as set forth in claim 4, means for varying the spacing of the two spaced portions of at least one of said linkage members.

6. In a machine tool as set forth in claim 4, a third and a fourth linkage member having each two spaced portions, one of the spaced portions of said third member being connected to the corresponding portion of the fourth member for pivotal movement about a fifth axis, the other portions of said third and fourth members being arranged for pivotal movement about said third and fourth axes respectively.

7. In a machine tool as set forth in claim 6, said radial direction extending vertically, and a tension spring connecting two of said linkage members for maintaining said spindle head means in a predetermined position relative to said frame means.

8. In a machine tool as set forth in claim 1, said radial direction extending vertically, and balancing means for maintaining said spindle head means in a predetermined position relative to said frame means.

9. In a machine tool as set forth in claim 8, said balancing means including a yieldably resilient member.

10. In a machine tool as set forth in claim 1, torsionally resilient coupling means interposed between said output member and said work spindle means.

11. In a machine tool as set forth in claim 1, said gear train including countershaft means, input gear means connected to said input member, output gear means connected to said output member, and intermediate gear means on said countershaft, said control means being operative to move said gear means relative to each other between a position in which said intermediate gear means meshingly engage said input and output gear means, whereby said gear train is interposed between said input and output members, and another position in which said intermediate gear means are out of engagement with said input and output gear means while said input and output members are directly connected.

References Cited in the file of this patent
UNITED STATES PATENTS

| | | |
|---|---|---|
| 806,316 | Bertels | Dec. 5, 1905 |
| 826,850 | Haynes | July 24, 1906 |
| 1,562,237 | Horner | Nov. 17, 1925 |
| 2,204,841 | Zwick | June 18, 1940 |
| 2,482,620 | Huck | Sept. 20, 1949 |
| 2,622,454 | Boehm | Dec. 23, 1952 |